Sept. 11, 1928.
J. KOENIGSBERGER
1,684,229
MEASURING INSTRUMENT
Filed July 21, 1926
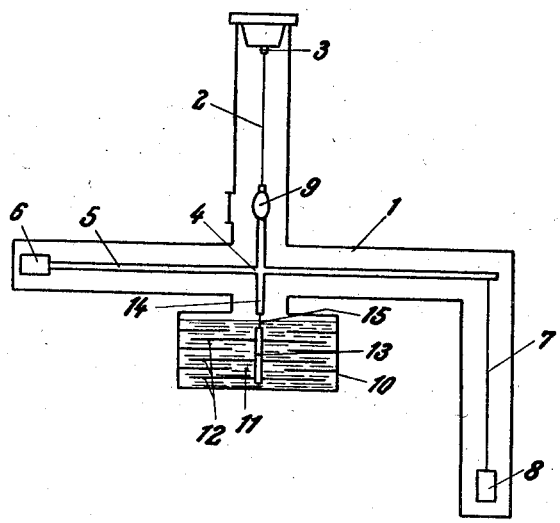
Inventor.
Johann Koenigsberger
By Lotka, Kehlenbeck & Farley
Attorneys.

Patented Sept. 11, 1928.

1,684,229

UNITED STATES PATENT OFFICE.

JOHANN KOENIGSBERGER, OF FREIBURG, GERMANY.

MEASURING INSTRUMENT.

Application filed July 21, 1926, Serial No. 123,988, and in Germany August 10, 1925.

This invention relates to an arrangement by means of which it is possible to utilize liquid damping in measuring instruments without causing variations of the zero point. It is intended in particular for use in measuring instruments operating on the principle of the torsion balance.

In some sensitive measuring instruments with thread suspension, for example in the case of Eötvös' torsion balance, air damping would be too weak because the moment of inertia of the suspended element is large. Magnetic damping is not very feasible because, with sensitive instruments, the member to be damped experiences, on account of its dia- or para-magnetism, a directional force which depends on its shape and position relatively to the point of rotation and which, although slight, may lead to incorrect results.

These disadvantages do not arise with liquid damping. The disadvantage of hitherto known liquid damping devices reside in the effect of the surface-tension of the liquid. Due to surface tension the suspended element may be drawn towards the wall of the vessel and rotated if the support for the damping device, passing through the surface of the liquid, becomes situated not quite exactly in the centre thereof. The capillary force exercised by the surface of the liquid on the support for the damping device depends to a large degree on the temperature. In the case of highly sensitive instruments, therefore, exact centering of the support passing through the surface of the liquid is necessary. It would of course be possible to employ very large vessels for the liquid since with these the centering would not need to be so exact. Such large vessels would, however, be accompanied by important practical disadvantages. Moreover, as recent experiments of various investigators have shown, local disturbances of the surface of the liquid are unavoidable in consequence of molecular variations of density. The effect of surface tension on the support for the damping device must therefore be reduced as far as possible.

It would be possible, to avoid surface tension, by entirely submerging the suspended member in the damping liquid, but in this case the damping would be much too considerable since the directional forces on the highly sensitive apparatus are comparatively small.

The object of the present invention is to arrange the damping device in such a manner that the liquid damping can cause no variation of the zero point of the instrument. This is effected by suspending the damping device on a short, thin wire or the like which is secured to the suspended element and passes through the middle of the surface of the damping liquid. In this manner the line along which the surface of the liquid contacts with the support, passing therethrough, of the damping device proper, that is, the wire or the like, and on the size of which the effect of surface tension is dependent, is reduced to the utmost.

An embodiment of the device according to the invention, employed with a torsion balance instrument is illustrated by way of example in the accompanying drawing which is a diagrammatic cross section.

A casing 1 contains the moving element 4 of the torsion balance suspended on a long wire or the like 2 secured at 3. The balance consists of a horizontal beam 5, from which a weight 6 and, at the other end, a second weight 8 suspended on a thread 7, are supported. A mirror 9 suitably supported may be provided. A casing 10 is filled with damping liquid 11 employed to damp the oscillation of the moving element. Several discs 12 secured on a vertical spindle 13 are arranged in this casing and constitute the damping device proper which is suspended from the lower part 14 of the suspended moving element by a wire 15. The wire 15 is extremely thin and short and passes as nearly as possible through the centre of the surface of the damping liquid. Consequently the surface does not come into contact with either the part 14 of the suspended element or with the spindle 13, but is in contact with the thin wire 15 only so that the effect of surface tension is very small on account of the short line of contact between wire and surface. The damping device is preferably arranged under the centre of gravity of the suspended element.

On oscillation of the torsion balance the damping discs in the liquid execute oscillations, about their vertical axis, relatively to the suspended element since the latter is heavier than the damping device. The wire 15 is thus torsioned but, since it is very much shorter than the wire 2, on which the entire suspended system hangs, the period of the oscillations of the damping device alone is very short compared with the period of oscillation of the entire suspended system. For this reason such torsional oscillations are without detrimental effect.

On the other hand the suspension of the damping device from the wire 16 is of particular advantage as compared with the hitherto usual rigid connections between the suspension and damping. Compensation of irregularities or bends in the system consisting of the suspended member and the damping device is thus made possible.

The oscillation of the damping device may be adjusted by varying the thickness and the length of the wire 15.

I claim:—

1. In a liquid damping arrangement for measuring instruments, in particular for torsion balances, the combination of a container, a damping liquid contained therein, a moving element suspended exteriorly of said damping liquid, a damping device proper located within said damping liquid, a short thin wire whereby said damping device is suspended from the suspended moving element of the instrument in said damping liquid.

2. In a liquid damping arrangement as claimed in claim 1, said wire passing through the centre of the surface of the damping liquid.

3. In a liquid damping arrangement for measuring instruments, in particular for torsion balances, a damping device proper consisting of a plurality of discs suspended in the damping liquid, a short thin wire bearing said damping device and suspended from the suspended moving element of the instrument, said wire passing through the centre of the surface of the damping liquid.

4. In a measuring instrument of the kind described, the combination of a container, a damping liquid contained therein, a torsion balance suspended exteriorly of said damping liquid, a damping device located within said damping liquid, and a relatively thin wire whereby said damping device is suspended from said torsion balance in said damping liquid, the surface of the latter bisecting said wire.

In testimony whereof I have hereunto set my hand.

JOHANN KOENIGSBERGER.